US008050855B2

(12) United States Patent
Coy et al.

(10) Patent No.: US 8,050,855 B2
(45) Date of Patent: Nov. 1, 2011

(54) METHOD AND SYSTEM FOR TRANSMITTING DATA TO A TRAFFIC INFORMATION SERVER

(75) Inventors: Dean Coy, Commerce, MI (US); Steven C. Tengler, Grosse Pointe Park, MI (US); Richard A. Johnson, Rochester Hills, MI (US)

(73) Assignee: General Motors LLC, Detroit, MI (US)

( * ) Notice: Subject to any disclaimer, the term of this patent is extended or adjusted under 35 U.S.C. 154(b) by 609 days.

(21) Appl. No.: 12/188,123

(22) Filed: Aug. 7, 2008

(65) Prior Publication Data

US 2010/0036595 A1 Feb. 11, 2010

(51) Int. Cl.
*G08G 1/09* (2006.01)
*G01W 1/00* (2006.01)
*G06F 19/00* (2006.01)

(52) U.S. Cl. ........ 701/119; 701/117; 455/11.1; 340/905

(58) Field of Classification Search .................. 701/119, 701/117, 2, 200, 213; 455/11.1, 457, 13.1, 455/41.2, 456.1
See application file for complete search history.

(56) References Cited

U.S. PATENT DOCUMENTS 5,933,100 A * 8/1999 Golding .................. 340/995.13
6,150,961 A 11/2000 Alewine et al.
6,333,703 B1 12/2001 Alewine et al.
6,711,493 B1 * 3/2004 Andrews et al. .............. 701/117
6,900,740 B2 5/2005 Bloomquist et al.
6,950,745 B2 9/2005 Agnew et al.
7,188,025 B2 * 3/2007 Hudson, Jr. ................... 701/117
7,366,606 B2 * 4/2008 Uyeki ........................... 701/117
7,885,760 B2 * 2/2011 Sutardja ........................ 701/117
2002/0030611 A1 * 3/2002 Nuesser et al. ............... 340/992
2003/0125845 A1 * 7/2003 Carlstedt et al. .................. 701/1
2004/0167710 A1 * 8/2004 Fushiki et al. ................ 701/208
2007/0100537 A1 5/2007 Parikh et al.
2007/0112503 A1 5/2007 Johnson et al.
2007/0225894 A1 9/2007 Tsukamoto
2008/0024323 A1 1/2008 Kadaba

* cited by examiner

*Primary Examiner* — Tan Q Nguyen
(74) *Attorney, Agent, or Firm* — Dierker & Associates, P.C.

(57) ABSTRACT

A method for transmitting data to a traffic information server includes obtaining, at a mobile vehicle, data including at least one of a vehicle speed and a vehicle location at a then-current time, and determining whether the data is redundant. Determining whether the data is redundant may be accomplished by at least one of comparing the data with other data previously transmitted to the traffic information server from an other mobile vehicle or determining whether the data falls within an expected range for a predetermined time interval. The method further includes transmitting the data, via a wireless communication system, to the traffic information server from the mobile vehicle if the data is determined to be non-redundant. Also disclosed herein is a system to perform the method.

21 Claims, 3 Drawing Sheets

METHOD AND SYSTEM FOR TRANSMITTING DATA TO A TRAFFIC INFORMATION SERVER

TECHNICAL FIELD

The present disclosure relates generally to methods and systems for transmitting data to a traffic information server.

BACKGROUND

Mobile vehicles are, in some instances, used as probes for transmitting information from an on-board telematics unit to a traffic information server. The information may include, for example, the speed that the vehicle is traveling and/or the location of the vehicle at a particular time. Similar information may also be transmitted from several other vehicles. The information from all of the vehicles may be compiled and analyzed to determine traffic conditions and to create traffic flow maps and/or traffic information services.

SUMMARY

A method for transmitting data to a traffic information server is disclosed herein. The method includes obtaining, at a mobile vehicle, data including at least one of a vehicle speed and a vehicle location at a then-current time. Determining whether the data is redundant is accomplished by comparing the data with other data previously transmitted to the traffic information server from another mobile vehicle, and/or determining whether the data falls within an expected range for a predetermined time interval. The method further includes transmitting the data, via a wireless communication system, to the traffic information server from the mobile vehicle if the data is determined to be non-redundant. Also disclosed herein is a system to accomplish the same.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the method and system disclosed herein advantageously prohibit redundant information from being transmitted from one or more vehicles on a particular road segment to a traffic information server. Information related to, for example, vehicle speed and location may be uploaded or otherwise transmitted over a wireless communication system from the vehicle to the traffic information server if the information is considered to be non-redundant. Redundancy may be determined by the vehicle by 1) comparing the information with other information previously transmitted to the traffic information server from another vehicle, and/or 2) determining whether the information falls within an expected range for a predetermined time interval. Prohibiting redundant information from being transmitted to the traffic information server advantageously reduces the number of transmissions to the traffic information server and reduces the cost associated with uploading such information. Additionally, prohibiting redundant information from being transmitted to the traffic information server substantially eliminates non-useful information from being transmitted (e.g., information that would not contribute to analysis of a traffic problem, for example, vehicles are traveling at posted speeds). Still further, prohibiting the transmission of redundant information reduces or eliminates monopolization of the communication channels, thereby enabling the transmission of other in-coming calls to the vehicle and/or to the traffic information server.

It is to be understood that, as used herein, the term "user" includes vehicle owners, operators, and/or passengers. It is to be further understood that the term "user" may be used interchangeably with subscriber/service subscriber.

The terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

It is to be further understood that "communication" is to be construed to include all forms of communication, including direct and indirect communication. As such, indirect communication may include communication between two components with additional component(s) located therebetween.

Figure 1:
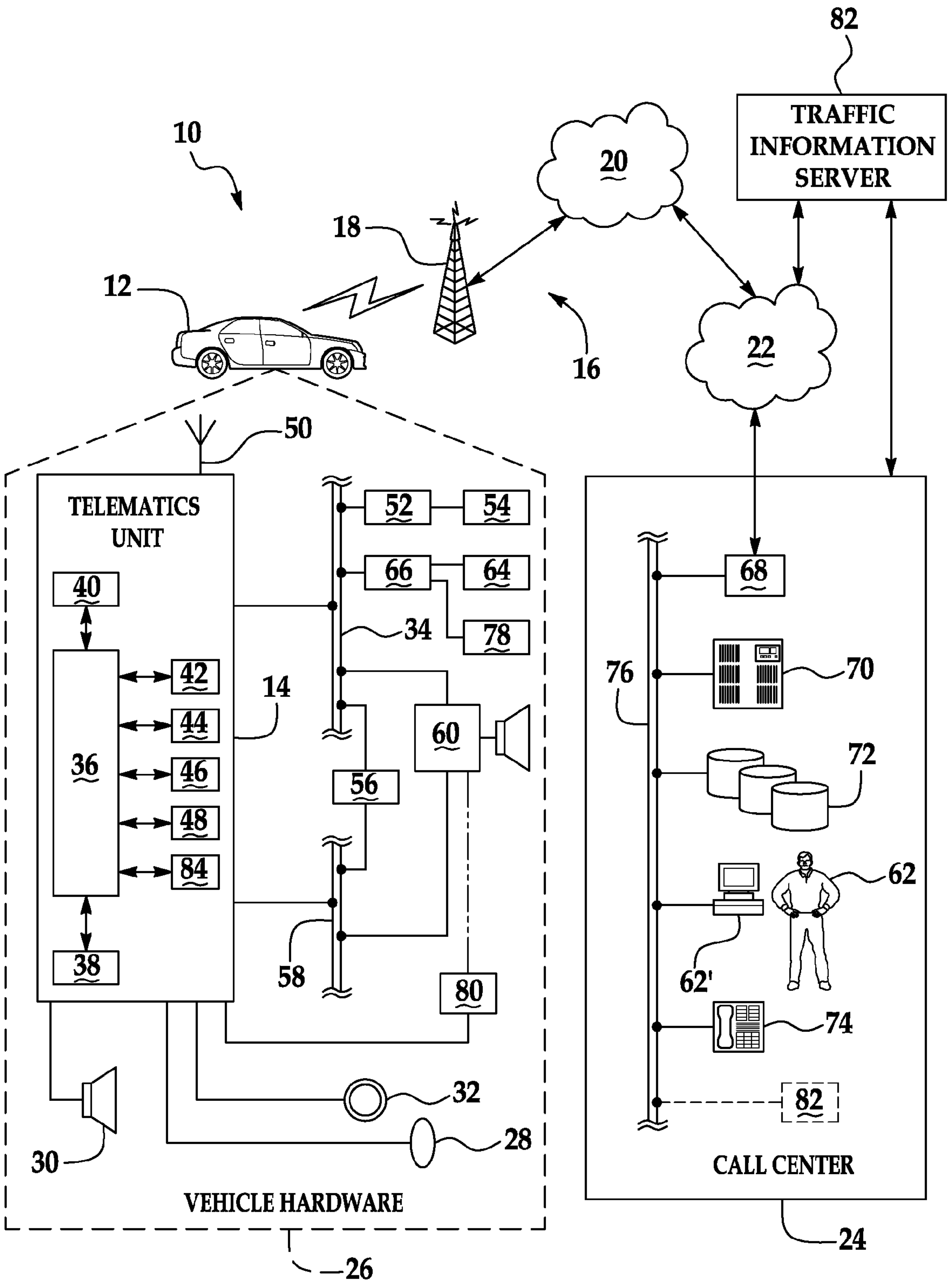
FIG. 1 is a schematic diagram depicting an example of a system for transmitting data to a traffic information server.

Referring now to FIG. 1, the system 10 includes a vehicle 12, a telematics unit 14, a wireless carrier/communication system 16 (including, but not limited to, one or more cell towers 18, one or more base stations and/or mobile switching centers (MSCs) 20, and one or more service providers (not shown)), one or more land networks 22, and one or more call centers 24. In an example, the wireless carrier/communication system 16 is a two-way radio frequency communication system.

The overall architecture, setup and operation, as well as many of the individual components of the system 10 shown in FIG. 1 are generally known in the art. Thus, the following paragraphs provide a brief overview of one example of such a system 10. It is to be understood, however, that additional components and/or other systems not shown here could employ the method(s) disclosed herein.

Vehicle 12 is a mobile vehicle such as a motorcycle, car, truck, recreational vehicle (RV), boat, plane, etc., and is equipped with suitable hardware and software that enables it to communicate (e.g., transmit and/or receive voice and data communications) over the wireless carrier/communication system 16. It is to be understood that the vehicle 12 may also include additional components suitable for use in the telematics unit 14.

Some of the vehicle hardware 26 is shown generally in FIG. 1, including the telematics unit 14 and other components that are operatively connected to the telematics unit 14. Examples of such other hardware 26 components include a microphone 28, a speaker 30 and buttons, knobs, switches, keyboards, and/or controls 32. Generally, these hardware 26 components enable a user to communicate with the telematics unit 14 and any other system 10 components in communication with the telematics unit 14.

Operatively coupled to the telematics unit 14 is a network connection or vehicle bus 34. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few. The vehicle bus 34 enables the vehicle 12 to send and receive signals from the telematics unit 14 to various units of equipment and systems both outside the vehicle 12 and within the vehicle 12 to perform various functions, such as unlocking a door, executing personal comfort settings, and/or the like.

The telematics unit 14 is an onboard device that provides a variety of services, both individually and through its communication with the call center 24. The telematics unit 14 generally includes an electronic processing device 36 operatively coupled to one or more types of electronic memory 38, a cellular chipset/component 40, a wireless modem 42, a navigation unit containing a location detection (e.g., global positioning system (GPS)) chipset/component 44, a real-time clock (RTC) 46, a short-range wireless communication network 48 (e.g., a BLUETOOTH® unit), and/or a dual antenna 50. In one example, the wireless modem 42 includes a computer program and/or set of software routines executing within processing device 36.

It is to be understood that the telematics unit 14 may be implemented without one or more of the above listed components, such as, for example, the short-range wireless communication network 48. It is to be further understood that telematics unit 14 may also include additional components and functionality as desired for a particular end use.

The electronic processing device 36 may be a micro controller, a controller, a microprocessor, a host processor, and/or a vehicle communications processor. In another example, electronic processing device 36 may be an application specific integrated circuit (ASIC). Alternatively, electronic processing device 36 may be a processor working in conjunction with a central processing unit (CPU) performing the function of a general-purpose processor.

The location detection chipset/component 44 may include a Global Position System (GPS) receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown).

The cellular chipset/component 40 may be an analog, digital, dual-mode, dual-band, multi-mode and/or multi-band cellular phone. The cellular chipset-component 40 uses one or more prescribed frequencies in the 800 MHz analog band or in the 800 MHz, 900 MHz, 1900 MHz and higher digital cellular bands. Any suitable protocol may be used, including digital transmission technologies such as TDMA (time division multiple access), CDMA (code division multiple access) and GSM (global system for mobile telecommunications). In some instances, the protocol may be a short-range wireless communication technologies, such as BLUETOOTH™, dedicated short-range communications (DSRC), or Wi-Fi.

Also associated with electronic processing device 36 is the previously mentioned real time clock (RTC) 46, which provides accurate date and time information to the telematics unit 14 hardware and software components that may require and/or request such date and time information. In an example, the RTC 46 may provide date and time information periodically, such as, for example, every ten milliseconds.

The telematics unit 14 provides numerous services, some of which may not be listed herein. Several examples of such services include, but are not limited to: turn-by-turn directions and other navigation-related services provided in conjunction with the GPS based chipset/component 44; airbag deployment notification and other emergency or roadside assistance-related services provided in connection with various crash and or collision sensor interface modules 52 and sensors 54 located throughout the vehicle 12; and infotainment-related services where music, Web pages, movies, television programs, videogames and/or other content is downloaded by an infotainment center 56 operatively connected to the telematics unit 14 via vehicle bus 34 and audio bus 58. In one non-limiting example, downloaded content is stored (e.g., in memory 38) for current or later playback.

Again, the above-listed services are by no means an exhaustive list of all the capabilities of telematics unit 14, but are simply an illustration of some of the services that the telematics unit 14 is capable of offering.

Vehicle communications generally utilize radio transmissions to establish a voice channel with wireless carrier system 16 such that both voice and data transmissions may be sent and received over the voice channel. Vehicle communications are enabled via the cellular chipset/component 40 for voice communications and the wireless modem 42 for data transmission. In order to enable successful data transmission over the voice channel, wireless modem 42 applies some type of encoding or modulation to convert the digital data so that it can communicate through a vocoder or speech codec incorporated in the cellular chipset/component 40. It is to be understood that any suitable encoding or modulation technique that provides an acceptable data rate and bit error may be used with the examples disclosed herein. Generally, dual mode antenna 50 services the location detection chipset/component 44 and the cellular chipset/component 40.

Microphone 28 provides the user with a means for inputting verbal or other auditory commands, and can be equipped with an embedded voice processing unit utilizing human/machine interface (HMI) technology known in the art. Conversely, speaker 30 provides verbal output to the vehicle occupants and can be either a stand-alone speaker specifically dedicated for use with the telematics unit 14 or can be part of a vehicle audio component 60. In either event and as previously mentioned, microphone 28 and speaker 30 enable vehicle hardware 26 and call center 24 to communicate with the occupants through audible speech. The vehicle hardware 26 also includes one or more buttons, knobs, switches, keyboards, and/or controls 32 for enabling a vehicle occupant to activate or engage one or more of the vehicle hardware components. In one example, one of the buttons 32 may be an electronic pushbutton used to initiate voice communication with the call center 24 (whether it be a live advisor 62 or an automated call response system 62'). In another example, one of the buttons 32 may be used to initiate emergency services.

The audio component 60 is operatively connected to the vehicle bus 34 and the audio bus 58. The audio component 60 receives analog information, rendering it as sound, via the audio bus 58. Digital information is received via the vehicle bus 34. The audio component 60 provides AM and FM radio, satellite radio, CD, DVD, multimedia and other like functionality independent of the infotainment center 56. Audio component 60 may contain a speaker system, or may utilize speaker 30 via arbitration on vehicle bus 34 and/or audio bus 58. The audio component 60 may also include software for receiving alerts from other vehicles 12 using the method(s) disclosed herein.

The vehicle crash and/or collision detection sensor interface 52 is/are operatively connected to the vehicle bus 34. The crash sensors 54 provide information to the telematics unit 14 via the crash and/or collision detection sensor interface 52 regarding the severity of a vehicle collision, such as the angle of impact and the amount of force sustained.

Other vehicle sensors 64, connected to various sensor interface modules 66 are operatively connected to the vehicle bus 34. Example vehicle sensors 64 include, but are not limited to, gyroscopes, accelerometers, magnetometers, emission detection and/or control sensors, environmental detection sensors, and/or the like. Non-limiting example sensor interface modules 66 include powertrain control, climate control, body control, and/or the like.

An in-vehicle speedometer 78 is also connected to various sensor interface modules 66 that are operatively connected to the vehicle bus 34. The speedometer 78 is generally used to measure the speed of the vehicle 12 (in miles-per-hour or kilometers-per-hour) at a then-current time. At least the speed of the vehicle 12 and the location of the vehicle 12 (determined from the location detection chipset/component 44 described above) at a then-current time may, in some instances, be compared (by the processing device 36 of the telematics unit 14) to other received data or predetermined ranges to determine whether the information or data is redundant, and thus should not be transmitted outside the vehicle 12. Generally, the processing device 36 is configured with one or more algorithms which compare and contrast the vehicle data with the other data or with the preset or configurable range(s) to determine the redundancy status. For example, if the processing device 36 receives V2V communications including speed data from a number of other vehicles over a previous, predetermined time period, where the speed data for each of these other vehicles falls within a calibrated, predetermined range, the processing device 36 will consider the speed data as redundant. On the other hand, if the processing device 36 receives V2V communications including the speed data from the other vehicles over the previous predetermined time period and the speed data does not fall within the calibrated, predetermined range, the processing device 36 will consider the speed data as non-redundant. As will be described in further detail below, if the vehicle's data (e.g., the speed data as used in the example immediately above) is considered to be non-redundant, the data is transmitted to a traffic information server 82.

In a non-limiting example, the vehicle hardware 26 includes a display 80, which may be operatively connected to the telematics unit 14 directly, or may be part of the audio component 60. Non-limiting examples of the display 80 include a VFD (Vacuum Fluorescent Display), an LED (Light Emitting Diode) display, a driver information center display, a radio display, an arbitrary text device, a heads-up display (HUD), an LCD (Liquid Crystal Diode) display, and/or the like.

Figure 2:
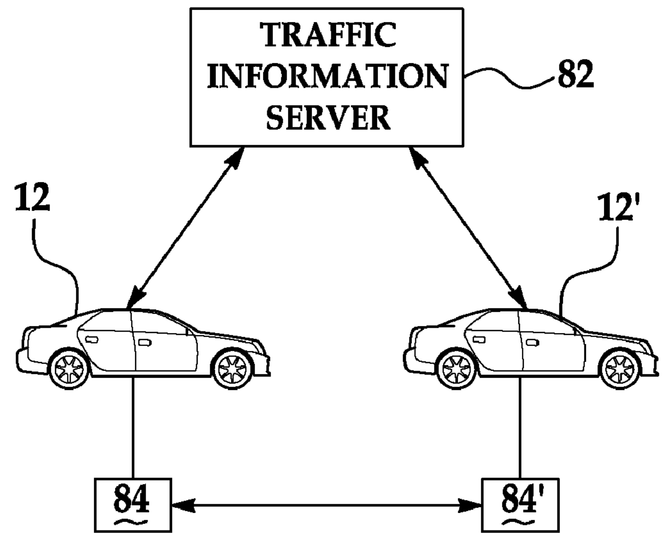
FIG. 2 is a schematic diagram depicting an example of a traffic information system.

The vehicle 12 further includes a vehicle-to-vehicle (V2V) communication system 84 operatively connected to the electronic processing device 36 of the telematics unit 14. The V2V communication system 84 generally allows the mobile vehicle 12 to wirelessly communicate with another mobile vehicle (shown as 12' in FIG. 2) also having V2V communication capability when the two vehicles 12, 12' are in relatively close proximity of each other (i.e., within a range which enables a wireless connection to be made between the V2V communication systems, such as, e.g., up to about 700 m). The V2V communication system 84 is used to communicate data (e.g., the speed of the vehicle 12, the location of the vehicle 12, or the like) to another mobile vehicle 12' within the communication range. For example, as shown in FIG. 2, mobile vehicle 12, which includes the V2V communication system 84, can wirelessly communicate and/or exchange data with another mobile vehicle 12' via a V2V communication system 84' if the vehicles 12 and 12' are within a suitable wireless connection range. It is to be understood that the vehicle 12 can communicate with a number of different vehicles also having V2V communication capabilities, if those vehicles are also within the V2V communication range.

Referring back to FIG. 1, wireless carrier/communication system 16 may be a cellular telephone system or any other suitable wireless system that transmits signals between the vehicle hardware 26 and land network 22. According to an example, wireless carrier/communication system 16 includes one or more cell towers 18, base stations and/or mobile switching centers (MSCs) 20, as well as any other networking components required to connect the wireless system 16 with land network 22. It is to be understood that various cell tower/base station/MSC arrangements are possible and could be used with wireless system 16. For example, a base station 20 and a cell tower 18 may be co-located at the same site or they could be remotely located, and a single base station 20 may be coupled to various cell towers 18 or various base stations 20 could be coupled with a single MSC 20. A speech codec or vocoder may also be incorporated in one or more of the base stations 20, but depending on the particular architecture of the wireless network 16, it could be incorporated within a Mobile Switching Center 20 or some other network components as well.

Land network 22 may be a conventional land-based telecommunications network that is connected to one or more landline telephones and connects wireless carrier/communication network 16 to call center 24. For example, land network 22 may include a public switched telephone network (PSTN) and/or an Internet protocol (IP) network. It is to be understood that one or more segments of the land network 22 may be implemented in the form of a standard wired network, a fiber of other optical network, a cable network, other wireless networks such as wireless local networks (WLANs) or networks providing broadband wireless access (BWA), or any combination thereof.

Call center 24 is designed to provide the vehicle hardware 26 with a number of different system back-end functions and, according to the example shown here, generally includes one or more switches 68, servers 70, databases 72, live and/or automated advisors 62, 62', as well as a variety of other telecommunication and computer equipment 74 that is known to those skilled in the art. These various call center components are coupled to one another via a network connection or bus 76, such as one similar to the vehicle bus 34 previously described in connection with the vehicle hardware 26.

The live advisor 62 may be physically present at the call center 24 or may be located remote from the call center 24 while communicating therethrough.

Switch 68, which may be a private branch exchange (PBX) switch, routes incoming signals so that voice transmissions are usually sent to either the live advisor 62 or the automated response system 62', and data transmissions are passed on to a modem or other piece of equipment (not shown) for demodulation and further signal processing. The modem preferably includes an encoder, as previously explained, and can be connected to various devices such as the server 70 and database 72. For example, database 72 may be designed to store subscriber profile records, subscriber behavioral patterns, or any other pertinent subscriber information. Although the illustrated example has been described as it would be used in conjunction with a manned call center 24, it is to be appreciated that the call center 24 may be any central or remote facility, manned or unmanned, mobile or fixed, to or from which it is desirable to exchange voice and data communications.

A cellular service provider generally owns and/or operates the wireless carrier/communication system 16. It is to be understood that, although the cellular service provider (not shown) may be located at the call center 24, the call center 24 is a separate and distinct entity from the cellular service provider. In an example, the cellular service provider is located remote from the call center 24. A cellular service provider provides the user with telephone and/or Internet services, while the call center 24 is a telematics service provider. The cellular service provider is generally a wireless carrier (such as, for example, Verizon Wireless®, AT&T®, Sprint®, etc.). It is to be understood that the cellular service provider may interact with the call center 24 to provide various service(s) to the user.

As shown in FIG. 1, the system 10 also includes the previously mentioned traffic information server 82. This server 82 may be part of the call center 24 (shown in phantom in FIG. 1) or may be a separate entity (also shown in FIG. 1) that is in selective communication with the vehicle 12 and, in some instances, the call center 24.

With reference again to FIG. 2, the traffic information server 82 is designed and configured to receive data from one or more vehicles 12, 12'. Such data includes, for example, speed and location of the vehicle 12 at a then-current time of day. The data received from vehicle 12 may be used, in addition to data received from other vehicles (e.g., vehicle 12'), to determine the currently-existing traffic conditions for a particular road segment and/or to generate a traffic report for, or map of a particular geographic area or region. The data may be wirelessly transmitted from the vehicle 12 to the traffic information server 82 via, e.g., the wireless communication system 16. Data that is transmitted to the traffic information server 82 may also be transmitted to the call center 24, if desirable.

In some instances, the traffic information server 82 may receive numerous transmissions (e.g., hundreds or thousands) within substantially the same time period. Such transmissions are often received from vehicles 12, 12' in areas which tend to have higher volumes of traffic at particular times of the day. These data transmissions may be substantially the same because the vehicles 12, 12' transmitting the data are traveling on the same road segment at about the same speed and at about the same time of day. It is believed that, in some instances, the number of transmissions may be overwhelming and cumbersome, rather than helpful in data analysis. Furthermore, the cost associated with uploading such voluminous amounts of data may be relatively large. It is believed that when the information is redundant, data transmissions from a smaller number of vehicles 12, 12' may be sufficient to deduce the then-currently traffic conditions, to generate a traffic report or map of the area, and/or to obtain data for future analysis without overloading the traffic information server 82. It is to be understood that the number of transmissions sufficient to deduce the desirable information varies from one road segment to another, and may depend, at least in part, on the road type, segment size, and the objective/goal (e.g., real-time navigation or traffic conditions, dynamic navigation, obtaining historical information, etc.). Examples of the methods described hereinbelow advantageously reduce the number of redundant data transmissions to the traffic information server 82 by recognizing redundant data and then prohibiting such data from being transmitted to the traffic information server 82.

Figure 3:
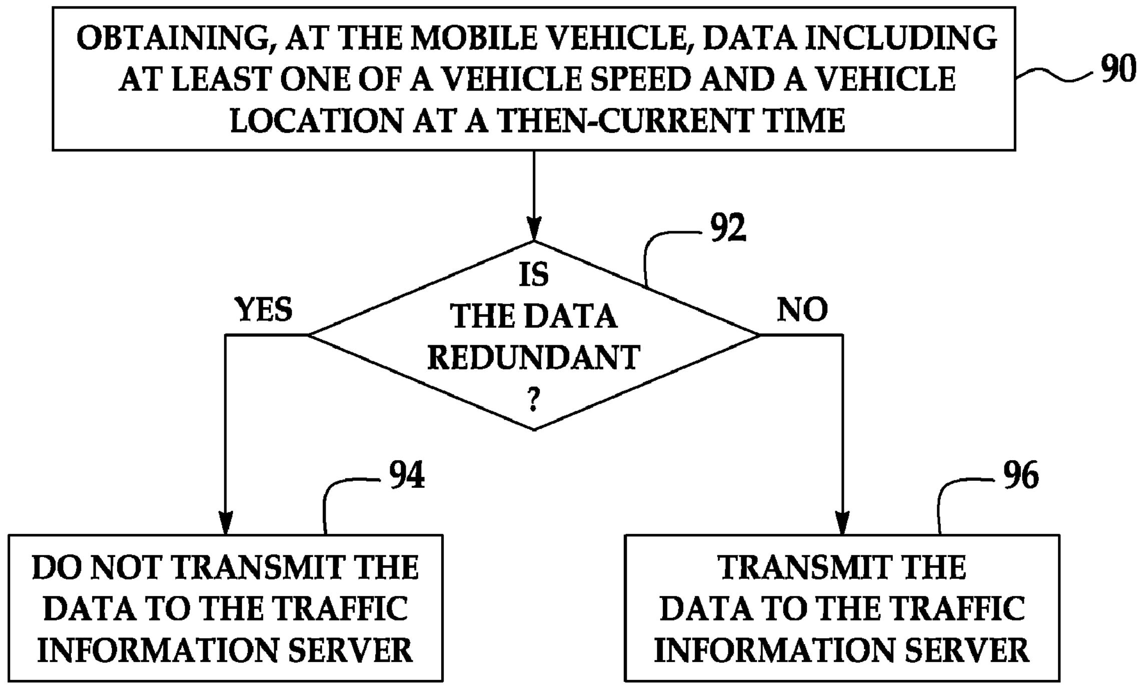
FIG. 3 is a flow diagram depicting an example of a method for transmitting data to a traffic information server.

An example of such a method is shown in FIG. 3. The method includes obtaining, at the mobile vehicle 12, data including at least one of vehicle speed and vehicle location at a then-current time (as shown by reference numeral 90). As previously mentioned, the telematics unit 14 may obtain the speed from the speedometer 78 and the location from the location detection chipset/component 44. Such data may be collected at predetermined intervals (e.g., every 5 minutes) set by the manufacturer or a call center advisor 62, at predetermined intervals during predetermined time periods (e.g., every 5 minutes during morning and evening rush hour periods), at event-based condition precedents (e.g., after a drop of speed of 10 mph or more within 30 seconds of time), and/or when prompted by the traffic information server 82 (e.g., during a macro-event such as a national or local crisis). It is to be understood that the call center 24 may prompt the vehicle 12 at any time for such information, regardless of whether the information is deemed redundant by the telematics unit 14 and thus not transmitted to the traffic information server 82.

The electronic processing device 36 of the telematics unit 14 uses the data to determine whether or not the data is redundant (as shown by reference numeral 92). If the data is determined to be redundant, then the data is not transmitted to the traffic information server 82 (as shown at reference numeral 94). If, however, the data is determined to be non-redundant, then the data is transmitted to the traffic information server 82 (as shown at reference numeral 96).

With reference again to FIG. 2, in one example, determining whether or not the data is redundant may be accomplished by comparing the data with other data previously transmitted to the traffic information server 82. Such other data is generally transmitted from another vehicle 12'. For instance, at least the speed and location data of the other vehicle 12' at a then-current time is transmitted to the traffic information server 82. Thereafter, the vehicle 12 receives the same speed and location data of the other vehicle 12' through the V2V communication systems 84 and 84', respectively. When the vehicles 12, 12' are within communication range and the V2V is enabled in each vehicle 12, 12', the vehicles 12, 12' connect and transmit or exchange such information. As a non-limiting example, each vehicle 12, 12' may communicate the data associated with that vehicle's most recent traffic information server upload to the other vehicle 12', 12. For example, vehicle 12 may transmit to vehicle 12' that its last upload to traffic information server 82 was transmitted at 12:30 pm and included the vehicle 12 speed and location at that time. Likewise, vehicle 12' may transmit to vehicle 12 that its last upload was at 12:45 pm and included the vehicle 12' speed and location at that time.

The vehicle 12 compares the communicated data from the other vehicle 12' with its own data and determines whether the two sets of data are substantially the same. By "substantially the same", it is meant that the two sets of data include 1) the same vehicle location or road segment (e.g., between two exits on an Interstate, at a particular intersection, or the like), 2) vehicle speed within a predetermined range (e.g., the speed limit ±5 mph, or the compared speeds are within 10 mph of each other), and 3) time of day within a predetermined range (e.g., data recordation times are within 5 minutes of each other). The processor 36 of the telematics unit 14 is programmed to compare the two sets of data and to look for data related to location, speed and/or time that does not match or is outside the predetermined parameters/ranges. The speed and/ or time ranges may be set as default values by the telematics unit 14 manufacturer, and may be altered by the call center 24 and/or the traffic information server 82. For example, if the amount of data in a given area exceeds what the traffic information server 82 deems necessary to deduce the then-current traffic conditions, the speed and/or time ranges may be increased, upon request by the call center 24 from the telematics unit 14, so that redundant transmissions are substantially decreased.

If the vehicle 12 determines that the two sets of data are substantially the same, then the data of the vehicle 12 is considered to be redundant of the data to which it is compared (e.g., the data from vehicle 12'). In this scenario, the vehicle 12 does not send its data to the traffic information server 82. On the other hand, if the vehicle 12 determines that the two sets of data are different (and thus non-redundant), then the data of the vehicle 12 is transmitted to the traffic information server 82.

While vehicle 12 is described herein as having performed the data comparison, it is to be understood that vehicle 12' may also be configured to perform such a comparison and to upload any non-redundant data to the traffic information server 82. In an example, if both vehicles 12, 12' are configured to transmit data to the traffic information server 82, the vehicle 12, 12' whose data has not yet been transmitted and is determined to be non-redundant will perform the data transmission/upload to the traffic information server 82. For example, data related to specific events during operation of the vehicle 12 (e.g., a hard-braking event, an acceleration event, or the like) that provides relatively progressive information related to the then-current traffic conditions and/or other services may be transmitted because such information is specific to the vehicle 12 and non-redundant.

It is to be understood that the vehicles 12, 12' may be configured to store the non-redundant data, erase the redundant data, continue to collect data until a transmission/upload queue is full of non-redundant data (and then transmit such data), and/or combinations thereof.

It is to be understood that the data from the vehicle 12 may also be considered redundant, and thus not transmitted to the traffic information server 82, if a predetermined number of other vehicles 12' has already transmitted substantially the same data within a predefined period of time before the time associated with the data of the vehicle 12 (i.e., ±5 minutes of the then-current time). In this example, the vehicle 12 may receive data communications from several other vehicles 12' within V2V communication range, where each data communication includes the speed and location of the transmitting vehicle, and a notification that such data has already been transmitted to the traffic information server 82 at a particular time. If the vehicle 12 determines that the data received from each of the other vehicles 12' is substantially the same as the data of vehicle 12 and that the traffic information server 82 has received the predetermined number of uploads within the predefined time period, the vehicle 12 does not transmit its data to the traffic information server 82. In the event that the predefined period of time has lapsed or the predetermined number of uploads has not been met, the vehicle 12 may transmit its data to the traffic information sever 82 even though the data may be same as the data previously uploaded from other vehicles 12'.

The following is a non-limiting example of determining data redundancy based upon data transmissions from a predetermined number of vehicles within a predefined time period. In this example, a number of vehicles 12' are sitting in a traffic jam on an expressway, and fifty of the vehicles 12' between two exits of the expressway have uploaded their respective locations and speeds to the traffic information server 82 between 5:00 pm and 5:30 pm. At 5:35 pm, the vehicle 12, upon entering the expressway at the first of the two exits, may receive a notification from, for example, three vehicles 12' within V2V communication range that the respective vehicle's location and speed data has been transmitted to the traffic information server 82 within the last minute. If the vehicle 12 recognizes that its data is substantially the same as the three other vehicles 12', it will not transmit such data to the traffic information server 82 if it also recognizes that the traffic information server 82 has received X number of similar uploads (e.g., 3) within Y time period (e.g., 1 minute) of the vehicle's 12 data, where X and Y are set by the manufacturer, the traffic information server 82, or the call center 24. In this example, if the predetermined number of uploads had not been met or the time period had lapsed when the vehicle 12 collects its own data, the vehicle 12 would upload its data to the traffic information server 82.

Figure 4:
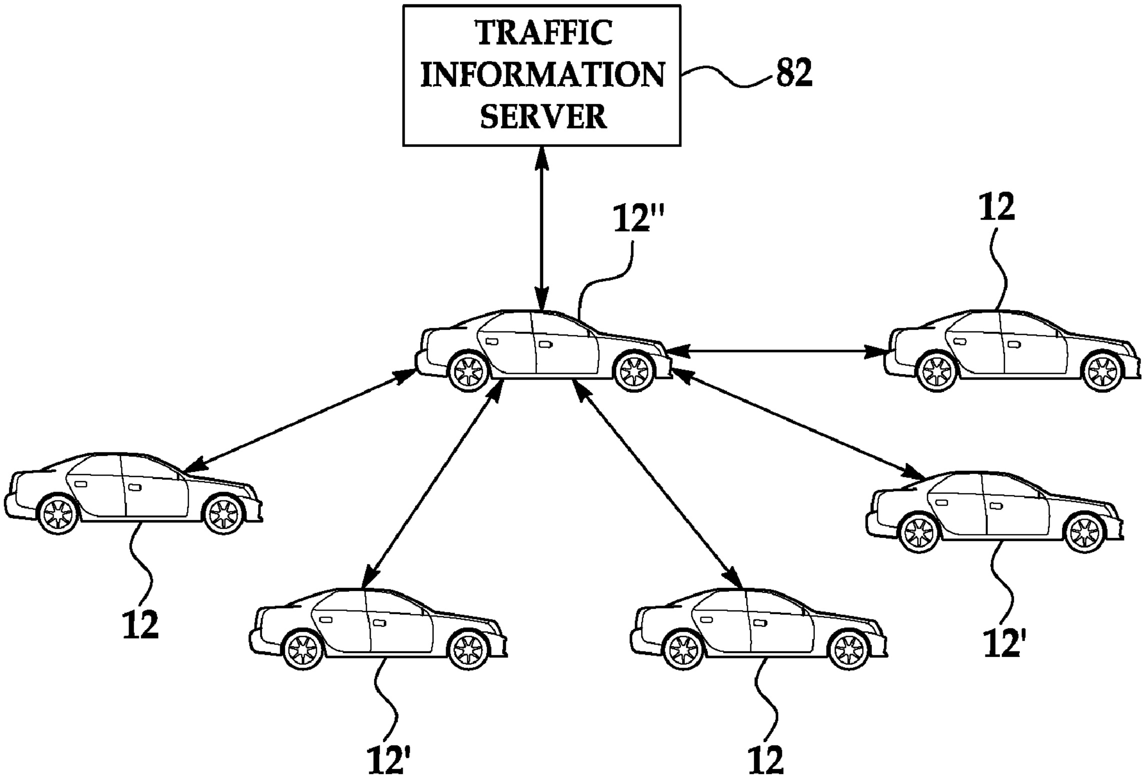
FIG. 4 is a schematic diagram depicting another example of a traffic information system.

Referring now to FIG. 4, rather than data being transmitted directly to the traffic information server 82 from each vehicle 12, 12' on the road segment, one vehicle (e.g., vehicle 12") may be designated as a hub, where data from other vehicles 12, 12' is communicated directly to the hub vehicle 12" rather than to the traffic information server 82. One or more hub vehicles 12" may be designated for one or more road segments in a particular area. As a non-limiting example, a hub vehicle 12" may be assigned to travel 5 miles of a divided highway during high volume traffic times. It is to be understood that, in this example, the hub vehicle(s) 12" collects the data from the other vehicles 12, 12', and transmits the collected data to the traffic information server 82. Generally, the other vehicles 12, 12' are not in communication with the traffic information server 82 directly. In one example, transmission of the collected data from the hub vehicle 12" occurs after the hub vehicle 12" determines that the received data is non-redundant when compared to its own data and data received from other vehicles 12, 12'.

In still another example, determining if the data is redundant may be accomplished by determining whether or not the data falls within an expected range for a predetermined time interval. The expected range may be based upon a posted speed of the road segment or upon historical data for a road segment. When the data exceeds or falls below the expected range, the vehicle 12 transmits the data to the traffic information server 82.

In one example, the expected range of the vehicle speed may be determined from a posted speed limit for a specific road segment. If, for instance, the posted speed limit for a suburban road is 45 miles-per-hour, the expected range of the vehicle speed may be from about 40 mph to about 50 mph, and if the posted speed limit for an expressway is 65 mph, the expected range of the vehicle speed may be from about 55 mph to about 75 mph.

To determine whether the vehicle's 12 data falls within the expected range of the posted speed limit, in an example, the posted speed limits and the corresponding expected ranges for each road segment are saved in the memory 38 of the telematics unit 14. As a non-limiting example, the processor 36 may be configured with navigation software which identifies the road segment(s) and the speed limit(s)/expected ranges associated therewith. As previously mentioned, road and speed limit information may be updated by downloading such updates to the telematics unit 14. The processing device 36 compares the actual speed of the vehicle 12 (measured by the speedometer 78) with the expected range (in this example defined using the posted speed limit for the road segment) to determine whether the actual speed of the vehicle 12 falls within the range. In another example, the posted speed limits or the expected ranges may be saved at the call center 24, and when the vehicle 12 turns onto a particular road segment, the telematics unit 14 may contact the call center 24 and retrieve the posted speed limit or expected speed range therefrom. In yet another example, the posted speed limits may be downloaded with the road segments by the vehicle 12 as part of a navigational route (e.g., turn-by-turn directions) used by the telematics unit 14.

As previously mentioned, the expected range of the vehicle speed may also be determined from a historical speed for a specific road segment. The historical speed is based on vehicle data collected on a particular day, at a particular time of day, during a particular week, month, or year, or combinations thereof. The historical speed may be determined from a traffic pattern model, which is based on a compilation of actual speeds from a plurality of mobile vehicles 12, 12' traveling on the specific road segment at a particular time of day and/or on a particular day, week, month, and/or year. The actual speeds on the road segment are monitored for a predetermined time period, and this data is used to generate the average or expected speed range for the road segment at a particular time on a particular day. As such, from the traffic pattern model, one may deduce estimated speeds that deviate from the posted speed limit on the road segment during certain times of the day, examples of which include times where traffic volumes tend to be higher (e.g., during rush hour) or lower (e.g., at midnight). For example, if the average speed of vehicles traveling on Big Beaver Road in Troy, Mich. at 6:00 a.m. everyday of the week for a 1-year period is 52 mph, the expected range of speed on that road at that time everyday may fall within about 5 mph of the posted 45 mph speed limit. Similarly, if the average speed of vehicles 12, 12' traveling on Big Beaver Road at 8:00 a.m. on a weekday for a 1-year period is 35 mph, the expected range of speed for that road at that time on those days would be substantially lower than the posted speed limit, due, at least in part, to a higher volume of traffic at rush hour.

The expected range determined from historical speeds (similar to the expected range based on posted speeds) is saved in the memory 36 of the telematics unit 14 or at the call center 24 as previously described hereinabove. Such expected ranges may be updated at any time, for example, after the monitoring of the speeds results in a change in the average speed at a particular time.

As previously mentioned, after the data comparison is made, if the vehicle's then-current speed is below or exceeds the actual or expected speed limit range associated with the road segment, such data may be transmitted to the traffic information server 82.

In addition to vehicle speed and location data at a then-current time, it is to be understood that other data may also be transmitted from the vehicle 12 to the traffic information server 82. Such additional data/information may bolster the traffic-related information generated from the received data. For example, data related to the vehicle speed and location may be transmitted, to the traffic information server 82, at periodic time stamps for a predetermined time interval (also referred to as breadcrumbs). The time stamps (or breadcrumbs) are taken along a particular route that the vehicle 12 is traveling, thereby marking the vehicle's path. Such information may be used in, e.g., determining a historical speed of a particular route, engineering planning of origin-destination travel patterns, and/or the like.

Furthermore, the vehicle 12 may also transmit lane information in addition to the time, location and speed information. For example, the vehicle 12 may transmit to the traffic information server 82 in which lane the vehicle 12 is traveling. Such information may be beneficial for more accurately determining a historical speed of that lane of the road segment, as well as determining the currently-existing traffic conditions on the road segment. For example, if the vehicle 12 is traveling on Big Beaver Road at 8:00 a.m., and the vehicle 12 is traveling in a high occupancy lane (e.g., the right lane), one would anticipate that the vehicle 12 is traveling at a speed that is substantially lower than if the vehicle 12 was traveling in a low occupancy lane (e.g., the center lane). Furthermore, data indicating that one lane is traveling at much slower speeds than other lanes on the same road segment may be beneficial for determining traffic conditions. It is to be understood that sensors 64 may be used to determine the lane of travel.

Another example of additional data that may be transmitted to the traffic information server 82 includes a number of vehicles 12, 12' traveling on a specific road segment at a then-current time. The number of vehicles 12, 12' is generally based on the number of vehicles within V2V range or sensed via radar technology (e.g., via adaptive cruise control). The data may be used by the traffic information server 82 to assess the volume of traffic on the road segment. The volume of traffic may be used in a traffic report prepared by the traffic information server 82, and/or to determine, e.g., a historical speed of the road segment.

Yet other examples of additional data that may be transmitted to the traffic information server 82 include at least one environmental condition detected by the environmental detection sensor (represented by sensor 64 in FIG. 1) and/or road conditions detected by a sensor (also represented by sensor 64 in FIG. 1). Non-limiting examples of environmental conditions include precipitation conditions, external lighting conditions, fog conditions, and/or the like, and/or combinations thereof. Non-limiting examples of road conditions include road construction, vehicle accidents, power outages for traffic lights, icy or wet road conditions, and/or the like, and/or combinations thereof. Any one of the environmental or road conditions could affect the speed of the vehicle 12, 12', 12" traveling on a particular road segment, even if the vehicles 12, 12', 12" are not traveling during times of high traffic volumes. As a result, the vehicle speed may deter, at least slightly, from the expected speed. This additional information may be used to help explain the data.

While several examples have been described in detail, it will be apparent to those skilled in the art that the disclosed embodiments may be modified. Therefore, the foregoing description is to be considered exemplary rather than limiting.

The invention claimed is:

1. A method for transmitting data to a traffic information server, the method comprising:

obtaining, at a mobile vehicle, data including at least one of a vehicle speed and a vehicle location at a then-current time;

determining whether the data is redundant by at least one of:

comparing the data with other data previously transmitted to the traffic information server from an other mobile vehicle; or determining whether the data falls within an expected range for a predetermined time interval; and transmitting the data, via a wireless communication system, to the traffic information server from the mobile vehicle if the data is determined to be non-redundant.

2. The method as defined in claim 1 wherein prior to comparing the data with the other data previously transmitted to the traffic information server, the method further comprises communicating the data obtained at the then-current time from the mobile vehicle to the other mobile vehicle.

3. The method as defined in claim 2 wherein the data is communicated from the mobile vehicle to the other mobile vehicle via vehicle-to-vehicle communication.

4. The method as defined in claim 2 wherein the data is not transmitted to the traffic information server if a predetermined number of mobile vehicles transmitted substantially the same data to the traffic information server within a predefined period of time before the then-current time.

5. The method as defined in claim 1 wherein the data is a vehicle speed, and wherein the expected range is determined from: a posted speed limit for a specific road segment; or a historical speed for the specific road segment based on a day, a time of day, a week, a month, a year, or combinations thereof.

6. The method as defined in claim 5 wherein the historical speed is determined from a traffic pattern model based on a compilation of actual speeds of a plurality of mobile vehicles traveling on the specific road segment at the time of day, or on the day, week, month, or year, or combinations thereof.

7. The method as defined in claim 1 wherein the data further includes at least one of: information transmitted at periodic time stamps for a predetermined time interval, a number of mobile vehicles traveling on a specific road segment at the then-current time, at least one environmental condition detected by a sensor of the mobile vehicle, road conditions detected by a sensor of the mobile vehicle, or combinations thereof.

8. The method as defined in claim 7 wherein the at least one environmental condition is selected from precipitation conditions, external lighting conditions, fog conditions, or combinations thereof.

9. The method as defined in claim 1 wherein the data transmitted from the mobile vehicle to the traffic information server includes information related to a lane of a road segment that the vehicle is traveling in.

10. The method as defined in claim 1 wherein the mobile vehicle is a hub vehicle, and wherein the method further comprises:

receiving, at the hub vehicle, data including at least one of the vehicle speed and the vehicle location from a plurality of other vehicles; and transmitting, from the hub vehicle to the traffic information server, the data for at least one of the plurality of other vehicles if the data is determined to be non-redundant.

11. A method for transmitting data to a traffic information server, the method comprising:

transmitting data, via a wireless communication system, to the traffic information server from a first mobile vehicle;

communicating other data from a second mobile vehicle to the first mobile vehicle;

comparing the other data received from the second mobile vehicle with the data previously transmitted to the traffic information server from the first mobile vehicle; and transmitting the other data, via a wireless communication system, to the traffic information server from the second mobile vehicle if the other data is different from the data transmitted from the first mobile vehicle.

12. The method as defined in claim 11 wherein communicating the other data from the second mobile vehicle to the first mobile vehicle is accomplished via vehicle-to-vehicle communication.

13. The method as defined in claim 11 wherein the other data is not transmitted to the traffic information server if a predetermined number of mobile vehicles transmitted substantially the same data to the traffic information server within a predefined period of time after obtaining, via the second mobile vehicle, the other data.

14. The method as defined in claim 11 wherein the data and the other data transmitted from the first and second mobile vehicles, respectively, to the traffic information server includes information related to a lane of a road segment that the first and second mobile vehicles are traveling in.

15. A traffic information system, comprising:

a first mobile vehicle configured to obtain data including at least one of a vehicle speed and a vehicle location at a then-current time;

a processor operatively disposed in the first mobile vehicle, the processor including one or more algorithms for determining whether the data is redundant by:

comparing the data with other data previously transmitted to the traffic information server from a second mobile vehicle; or determining if the data falls within an expected range for a predetermined period of time; and a traffic information server in selective operative communication with the first and second mobile vehicles and configured to receive a transmission including the data if the data is determined to be non-redundant.

16. The traffic information system as defined in claim 15, further comprising a vehicle-to-vehicle communication system configured to communicate the data from the first mobile vehicle to the second mobile vehicle, the vehicle-to-vehicle communication system being in operative communication with the processor.

17. The traffic information system as defined in claim 15 wherein the data is the vehicle speed, and wherein the expected range is based on a posted speed limit for a specific road segment or a historical speed for the specific road segment.

18. The traffic information system as defined in claim 17 wherein the historical speed is determined from a traffic pattern model based on a compilation of actual speeds of a plurality of mobile vehicles traveling on the specific road segment at a specific time of day, or on a specific day, week, month, or year, or combinations thereof.

19. The traffic information system as defined in claim 15 wherein the data further includes at least one of: information transmitted at periodic time stamps for a predetermined time interval, a number of mobile vehicles traveling on a specific road segment at the then-current time, at least one environmental condition detected by a sensor of the first mobile vehicle, road conditions detected by a sensor of the first mobile vehicle, or combinations thereof.

20. The traffic information system as defined in claim 19 wherein the at least one environmental condition is selected from precipitation conditions, external lighting conditions, fog conditions, or combinations thereof.

21. The traffic information system as defined in claim 15 wherein the data from the first mobile vehicle to the traffic information server includes information related to a lane of a road segment that the first mobile vehicle is traveling in.

* * * * *